A. H. WARTH
Nov. 8, 1932. BOTTLE CAP AND METHOD OF PRODUCING THE SAME Re. 18,648
Original Filed Nov. 2, 1926
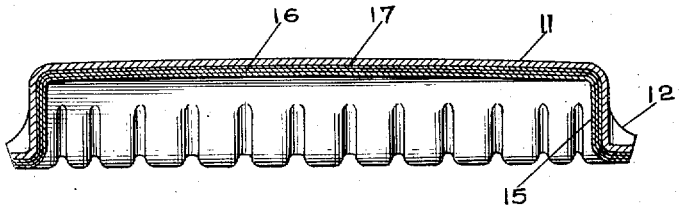
INVENTOR.
Albin H. Warth
BY
Philip Sawyer Reed & Kennedy
ATTORNEYS.

Reissued Nov. 8, 1932

Re. 18,648

UNITED STATES PATENT OFFICE

ALBIN H. WARTH, OF BALTIMORE, MARYLAND, ASSIGNOR, BY MESNE ASSIGNMENTS, TO CROWN CORK & SEAL COMPANY, INC., OF NEW YORK, N. Y., A CORPORATION OF NEW YORK

BOTTLE CAP AND METHOD OF PRODUCING THE SAME

Original No. 1,732,958, dated October 22, 1929, Serial No. 145,725, filed November 2, 1926. Application for reissue filed February 28, 1931. Serial No. 519,147.

This invention relates to bottle caps and to a method of producing the same.

Closures of the well known crown cork type ordinarily comprise a metal shell having a corrugated skirt and a sealing disk of cork. In cases where cork is injurious to the packaged contents, paper or pasteboard sealing disks, or disks lined with paper, have been used. For example, closures for milk have been proposed that have paper linings formed of jute tag, sulfite tag, or other more or less pervious papers. These closures, however, have been found objectionable for the reason that they impart to the milk or cream, an appreciable taste, particularly after pasteurization.

It is an object of the present invention to provide a closure of the crown type suitable for packaging cream, milk and other food products without imparting a foreign taste to the packaged contents.

It is a further object of the invention to provide a method for producing such caps effectively and economically.

With these objects, and others, in view, the invention consists in the method, features, combinations, details of construction and arrangements of parts which will first be described in the accompanying drawing and then more particularly pointed out.

In the drawing, the single figure is a sectional view of a bottle cap constructed in accordance with the invention.

Referring to the drawing, the cap illustrated as an example includes a crown shell 11 having a corrugated skirt 12, and formed of thin sheet metal, e. g. so-called tin plate. Within the shell 11 is an over-all sealing lining i. e. a lining covering not only the inner face of the shell but the corrugated skirt as well. This lining includes a facing 15 for contact with the bottled contents, of non-metallic material substantially tasteless and substantially impervious to aqueous liquids. In the cap illustrated as an example, the facing 15 is formed of vegetable parchment of a thickness of about .002″ to .003″.

In order to obtain a proper thickness for sealing and to provide a strengthening backing or support for the facing 15, to prevent fracture thereof, the lining includes a paper base 16. In the embodiment illustrated as an example, the base 16 is formed of jute tag, sulfite tag, or the like, of a thickness of from .006″ to .010″ and capacitated to take a right angle bend without fracture. Such a paper base not only gives thickness to the sealing lining but strengthens the parchment facing and prevents fracture under the bending of the stamping operation later referred to.

In order further to protect the bottled contents against foreign taste, the base 16 of the present embodiment is faced on both sides. As shown, the inner facing 17 is a duplicate of the outer facing 15. Even should the contents penetrate the facing 15, due to a tear or the like, the inner facing 17 protects the contents from the tin plate and so prevents any metallic taste being imparted to the contents. This three-ply lining has a further advantage in connection with the cap production, hereinafter described.

The cap is applied to a bottle in the usual manner of applying crown corks. That is, a seal is effected between the lining and the bottle mouth by pressure, and the skirt is bent down to lock around the bottle mouth. With the closure described the facing 15 presented to the bottled contents is substantially tasteless and substantially impervious to milk, cream and other aqueous liquids. Consequently, the cap is particularly adapted for packaging such materials without imparting any papery or metallic taste thereto, while retaining the advantages of the crown cork type of closure.

In the manufacture of the caps described, sheets of vegetable parchment are pasted to both sides of a sheet of paper stock and the three-ply lining thus formed is pasted to a sheet of tin plate. Any suitable adhesive may be used but it should be insoluble in aqueous liquids, such as milk and cream, both before and after pasteurization. This combined sheet is then punched and stamped into crown caps in the same manner as ordinary metal crown shells are formed.

By the use of a three-ply lining an advantage is gained in manufacturing in that by pasting thin facings on both sides of the paper base the shrinkages are balanced and the resulting sheet does not tend to curl. With an over-all sealing lining production is economical because the lining can be associated with the metal plate before the crown is stamped out. Moreover, an over-all lining prevents rust stains on the bottle mouths.

If desired, the facing 15 may be given a light coating of wax to prevent the parchment from sticking to the bottle mouth after pasteurization.

What is claimed is:

1. A bottle cap comprising a crown shell and a three-ply, over-all sealing lining, said lining consisting of a paper base faced on both sides with relatively thin vegetable parchment.

2. A bottle cap comprising a crown shell and a three-ply, over-all sealing lining, said lining consisting of a paper base formed of stock capacitated to take a right-angle bend without fracture, the base being faced on both sides with relatively thin vegetable parchment.

3. The method of producing bottle caps which comprises pasting a sheet of vegetable parchment to a sheet of paper stock, pasting the paper stock to a sheet of tin plate and stamping a crown closure from the combined sheet so formed.

4. The method of producing bottle caps which comprises pasting sheets of vegetable parchment to the two sides of a sheet of paper stock, pasting the resulting three-ply sheet to a sheet of tin plate, and stamping a crown closure from the combined sheet so formed.

5. The method of producing bottle caps which comprise pasting a sheet of vegetable parchment to a sheet of paper stock, pasting the paper stock to a sheet of tin plate, and coating the parchment with wax.

6. A bottle cap comprising a sheet metal body having an overall facing of vegetable parchment pasted to its inner surface.

7. The method of producing bottle caps which comprises pasting to a face of a sheet metal body, a sheet of paper stock having on both sides thereof a facing which is substantially tasteless and impervious to aqueous liquids, and stamping from said combined sheets a closure having an overall paper stock lining.

In testimony whereof, I have hereunto set my hand.

ALBIN H. WARTH.